United States Patent

Hosier

(10) Patent No.: US 8,026,960 B2
(45) Date of Patent: Sep. 27, 2011

(54) IMAGE SENSOR AND ASSOCIATED READOUT SYSTEM

(75) Inventor: Paul A. Hosier, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 647 days.

(21) Appl. No.: 12/111,231

(22) Filed: Apr. 29, 2008

(65) Prior Publication Data

US 2009/0268070 A1    Oct. 29, 2009

(51) Int. Cl.
*H04N 3/14*    (2006.01)
*H04N 5/335*   (2011.01)
*H04N 1/40*    (2006.01)
*H04N 5/217*   (2011.01)

(52) U.S. Cl. ........ 348/241; 348/294; 348/302; 348/308; 358/471

(58) Field of Classification Search .................. 348/241; 358/371, 382, 383
See application file for complete search history.

(56) References Cited

U.S. PATENT DOCUMENTS

| | | | |
|---|---|---|---|
| 5,081,536 A | 1/1992 | Tandon et al. | |
| 5,105,276 A | 4/1992 | Schrock | |
| 5,148,268 A | 9/1992 | Tandon et al. | |
| 5,493,423 A | 2/1996 | Hosier | |
| 5,654,755 A | 8/1997 | Hosier | |
| 2004/0239788 A1* | 12/2004 | Sugiyama et al. | 348/302 |
| 2005/0094222 A1 | 5/2005 | Tseng et al. | |

* cited by examiner

*Primary Examiner* — David Ometz
*Assistant Examiner* — Richard Bemben
(74) *Attorney, Agent, or Firm* — Simpson & Simpson, PLLC

(57) ABSTRACT

An imaging apparatus, such as useable in a digital camera or input scanner, comprises a first photodiode and a first integrating amplifier associated therewith. A first reset capacitor, selectably associated with the first photodiode, flushes charge on the first photodiode through the first integrating amplifier. A first CDS capacitor is downstream of the first integrating amplifier. A hold capacitor forms a hold node downstream of the first CDS capacitor. A pixel amplifier reads out a signal from the hold node at a predetermined time. The pixel amplifier is selectably controllable between a standby mode and a power mode.

18 Claims, 3 Drawing Sheets

IMAGE SENSOR AND ASSOCIATED READOUT SYSTEM

TECHNICAL FIELD

The present disclosure relates to image sensors and associated readout systems, as would be found, for example, in digital cameras or input scanners found in office equipment.

BACKGROUND

Image sensor arrays, such as found in digital document scanners and digital cameras, typically comprise a linear array of photosites which raster scan a focused image, or an image bearing document, and convert the set of microscopic image areas viewed by each photosite to image signal charges. Following an integration period the image signal charges are amplified and transferred to a common output line or bus through successively actuated multiplexing transistors.

Currently there are two generally accepted basic technologies for creating such linear arrays of photosites: Charge-coupled devices, or CCD's, and CMOS. In CMOS, the photosites include photodiodes, which output a charge in response to light impinging thereon. In the scanning process, bias and reset charges are applied in a predetermined time sequence during each scan cycle. Certain prior art patents, such as U.S. Pat. No. 5,081,536 assigned to the assignee hereof, disclose two-stage transfer circuits for transferring image signal charges from the photosites in CMOS image sensors.

In practical applications of photosensitive devices, two key sources of noise, which can affect the integrity of the output image signals, are "fixed pattern noise" and "thermal noise." The first of these types of noise relates to the fact that, within any device, individual photodiodes and sets of circuitry associated with the various photodiodes will have some variation in performance, and the variation in performance among the different sets of circuitry will result in a fixed pattern of noise effecting the signals, resulting in a consistent pattern of distortions in the output signals, depending on which specific set of circuitry a particular subset of the video signals passes through. Thermal noise is created by the fact that the output of a particular set of circuitry is likely to change over time, due to the random thermal movement of electrons in conductors.

U.S. Pat. Nos. 5,105,276 and 5,654,755 describe the principle of using a "dark signal" at some point in the operation of a CCD or CMOS image sensor system, respectively, to isolate noise of various types from a useable signal. A dark signal is, broadly speaking, a signal derived from a photosensor when it is known that no light is impinging on the photosensor. Typically the dark signal is subtracted from a total signal output from a photosensor, thus leaving the pure signal as a remainder.

U.S. Patent Publication Serial No. US 2005/0094222-A1 discloses an image sensor in which dark signals and total signals from a photosensor are, through a system of switches, directed to separate holding capacitors with each readout of the photosensor. During a readout process, the dark signal is subtracted from the total output signal.

U.S. Pat. No. 5,148,268 discloses an overall architecture for a CMOS-based full-color photosensitive chip.

U.S. Pat. No. 5,493,423 discloses the use of a "standby mode" for an amplifier used with a "fat zero" transfer circuit associated with a photosensor.

SUMMARY

According to one aspect, there is provided an imaging apparatus, comprising a first photodiode and a first integrating amplifier associated therewith. A first reset capacitor, selectably associated with the first photodiode, flushes charge on the first photodiode through the first integrating amplifier. A first CDS capacitor is downstream of the first integrating amplifier. A hold capacitor forms a hold node downstream of the first CDS capacitor. A pixel amplifier reads out a signal from the hold node at a predetermined time. The pixel amplifier is selectably controllable between a standby mode and a power mode.

DETAILED DESCRIPTION

Figure 1:
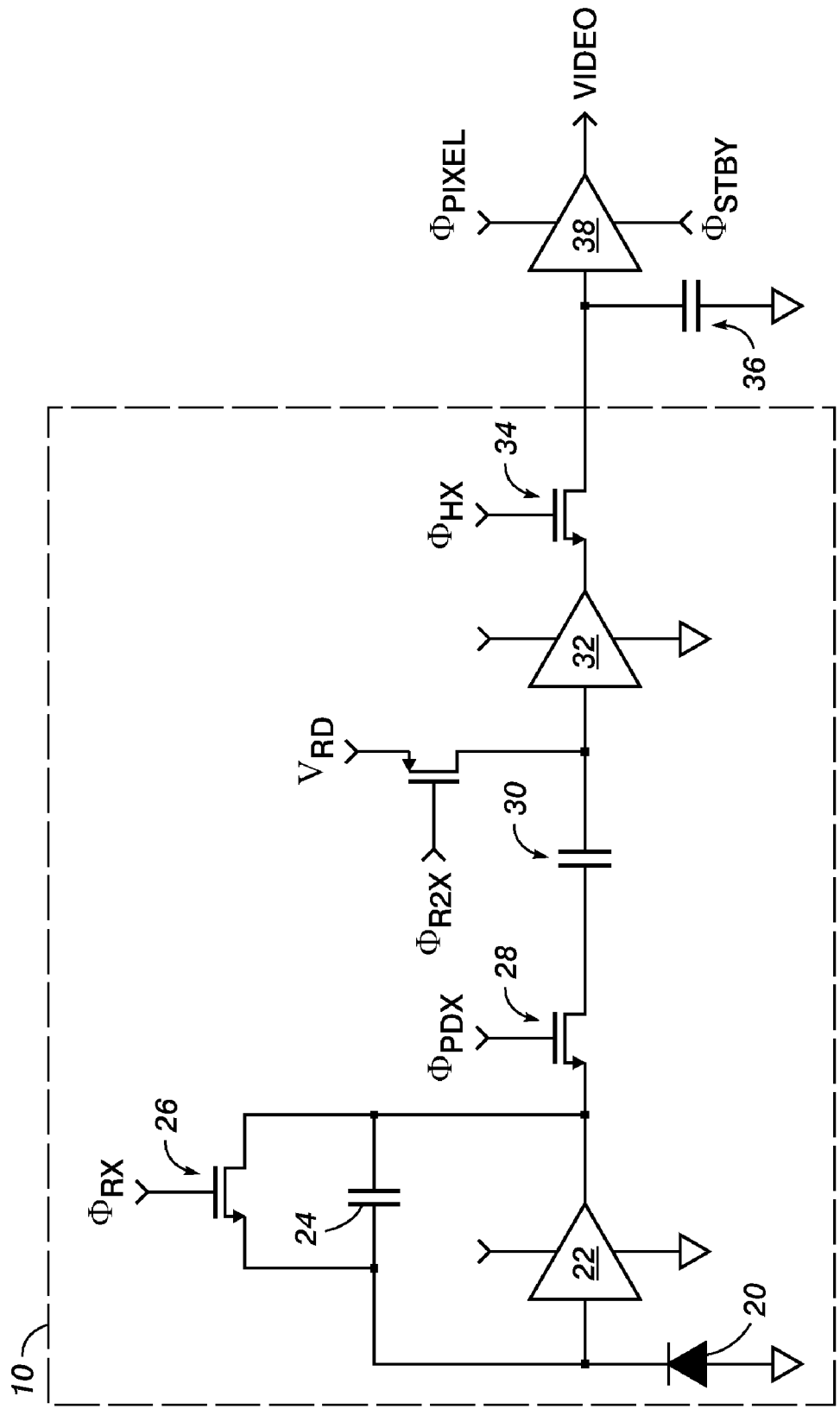
FIG. 1 is a schematic diagram of a single photosite and associated readout circuitry.

FIG. 1 is a schematic diagram of a single photosensor and associated readout circuitry, indicated generally as "photosite" 10. The photosite 10 includes a photodiode 20, which accepts light in an exposure situation and generates charge therefrom. Photodiode 20 is connected with an integrating amplifier 22 and an integrating capacitor 24. Integrating capacitor 24 is effectively shorted by a high signal on reset (RX) switch 26. These in turn are connected in series, through PDX switch 28, to correlated-double-sampling (CDS) capacitor 30. The opposite side of CDS capacitor 30 includes an external tap for a predetermined reference voltage $V_{RD}$, controllable through a second reset switch R2X. The opposite side of CDS capacitor 30 is further connected, through amplifier 32 and hold switch 34, to a hold node defined by hold capacitor 36. Signals are read out through a video line through what is here called a pixel amplifier 38. As will be described below in reference to an alternative embodiment, a plurality of photosites 10 may be associated with a single hold node and pixel amplifier 38. Pixel amplifier 38, as shown, includes two inputs, a standby input $\Phi_{STBY}$ and a relatively higher "power" input $\Phi_{PIXEL}$.

Figure 2:
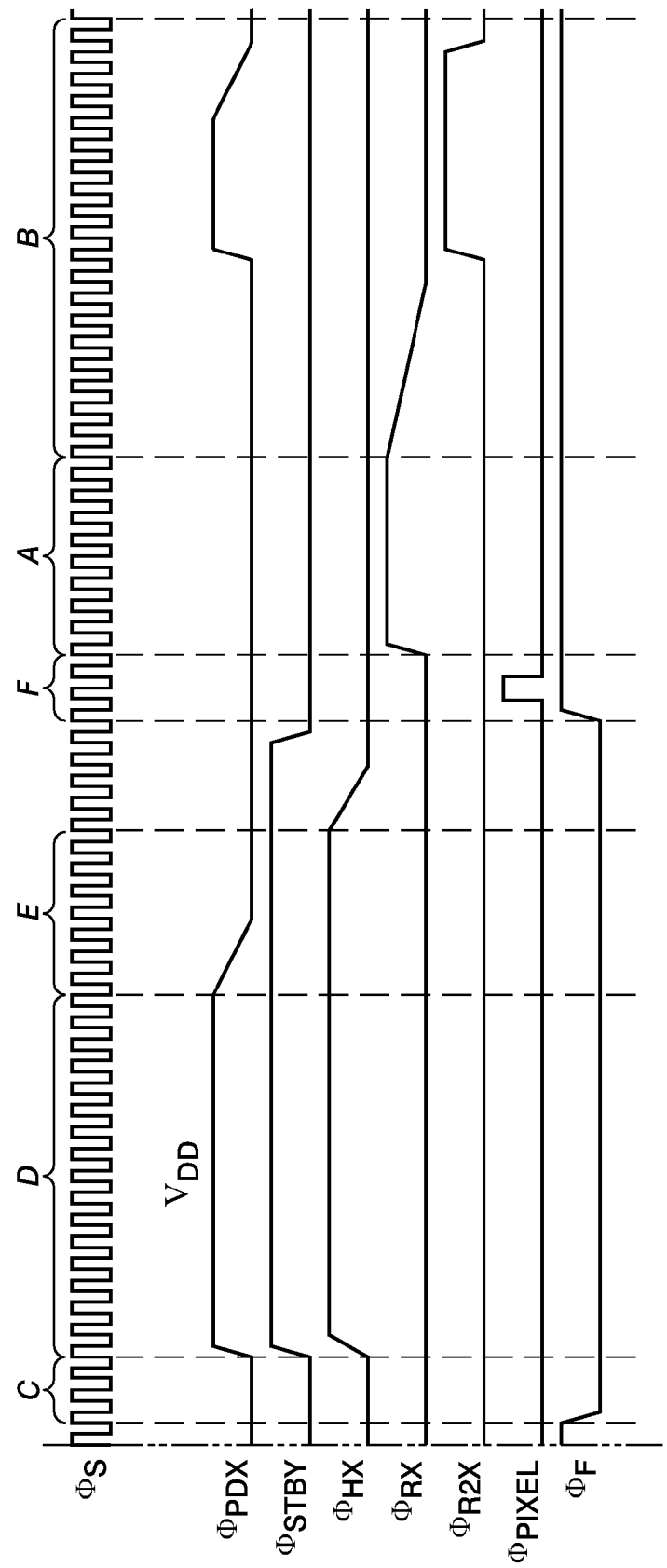
FIG. 2 is a timing diagram illustrating one cycle of operation of the circuitry of FIG. 1.

FIG. 2 is a timing diagram illustrating one cycle of operation of the circuitry of FIG. 1. In the discussion, indicators such as $\Phi_{RX}$, $\Phi_{PDX}$, etc., associated with circuit elements in FIG. 1 correspond to like indicators of voltage states in FIG. 2.

Starting with the portion marked A in FIG. 2, a charge is placed on reset (RX) switch 26, shorting reset capacitor 28: the effect of this is to cause any charge on photodiode 20 to be flushed out through integrating amplifier 22. Because PDX switch 28 is low (non-conductive), no charge is transferred to CDS capacitor 30. This step resets any charge on photodiode 20, and isolates a "dark voltage" on integrating amplifier 22. In one practical embodiment, the capacitance of reset capacitor 28 is about 9 fF.

In portion B, a signal on PDX switch 28 goes high, locking the dark voltage from integrating amplifier 22 onto the left side (as shown) of CDS capacitor 30. Simultaneously, the signal associated with R2X goes high, causing a predetermined reference voltage $V_{RD}$ to be applied to the right side of CDS capacitor 30. The resulting voltage on CDS capacitor 30 is thus the dark voltage from integrating amplifier 22 (including any thermal noise component), minus the reference voltage $V_{RD}$. In one practical embodiment, the capacitance of CDS capacitor 30 is about 0.275 pF.

In the interval, of predetermined duration, shown as portion C, light received by photodiode 20 is generated, and integrated to form a useable signal on the output of integrating amplifier 22. Starting at portion D, $\Phi_{STBY}$, $\Phi_{PDX}$ and $\Phi_{HX}$ are raised, causing a current flow through CDS capacitor 30. At this stage no current flows through integrating capacitor 24, except the signal from photodiode 20, since the input to integrating amplifier 22 is high impedance; and so the output of integrating amplifier 22 drives the current in the CDS capacitor 30. The resulting signal out of amplifier 32 is the signal voltage minus the dark voltage, i.e., the voltage associated with the light on photodiode 20, plus the reference voltage, $V_{RD}$. This signal voltage is defined as the current on photodiode 10 times the integration time, divided by the capacitance of the integrating capacitor 24.

The effect of this readout on the CDS capacitor 30 is that the left side of CDS capacitor 30 holds the dark signal plus the signal voltage, while the right side holds $V_{RD}$ plus the signal voltage. Because the node associated with the $V_{RD}$ holds $V_{RD}$ plus the signal voltage, the dark signal will be subtracted out, leaving only the signal voltage. This technique is known as a "correlated double sample" on the CDS capacitor 30.

At portion E, the signal on PDX switch 28 is dropped while the signal on hold switch (HX) 34 remains high to enable the signal voltage to pass from CDS capacitor 30 through amplifier 32 to the hold node formed by hold capacitor 36. The signal on hold switch (HX) must be held long enough to avoid transients as the voltage is transferred.

At portion F, a relatively brief pixel pulse is applied to the $\Phi_{PIXEL}$ input to pixel amplifier 38, causing the pixel amplifier 38 to go into full-power mode, in turn causing the signal at the hold node 36 to be read out on the video line. In one embodiment, the $\Phi_{PIXEL}$ line associated with each pixel amplifier 38 is independently addressable, while the $\Phi_{STBY}$ line is common to all pixel amplifiers on a chip or in an apparatus. A typical value for the relative current of the output of pixel amplifier 38 is 10 microamperes in standby mode, and 1 milliampere in high-power mode, for a ratio of 1:100. A shift register could be used to enable the sequential selection of each amplifier on a sensor chip until all amplifiers are read out.

In the apparatus and system of the present disclosure, since the dark level and dark noise is subtracted out on the single CDS capacitor 30 leaving the signal to be stored on single hold capacitor 36, the corrected signal can be read out of the pixel amplifier 38 in the time period corresponding to one settling time period of the amplifier. In contrast, in the system of U.S. Patent Publication 2005/0094222-A1 (Tseng), a signal is read out from a first holding capacitor and then a dark reference is read out from a second holding capacitor, effectively doubling the time for a single pixel readout. Further in Tseng, the light and dark holding capacitors have to be reset with each signal readout. Tseng's use of two holding capacitors results in thermal noise (kT/C noise) from two capacitors in a single readout cycle: in contrast, the present embodiment only has thermal noise from one hold capacitor. Further in Tseng, the amplifier outputting to video is off completely during the transfer stage; with the present embodiment, where the pixel amplifier 38 is in a standby mode during the transfer stage, the internal modes are at known value with no pixel-to-pixel offset that would be caused by the "floating" internal nodes of the pixel amplifier. Tseng would have nonuniformity and lag effects due to floating nodes if they did not reset light and dark capacitors during the pixel readout "on" time. This reset and readout of dark and light level reduces the pixel readout rate in half.

Further, although U.S. Pat. No. 5,493,423, cited above, includes an amplifier in a standby mode for a portion of a readout cycle, the amplifier in the '423 patent has a small reset capacitance; it is counterintuitive to use such a standby system for an amplifier with a relatively large hold capacitor, as with the present embodiment. In one practical embodiment, for instance, the capacitance of hold capacitor 36 is about 0.275 pF, while the input capacitance of pixel amplifier 38 is about 0.02 pF, for an approximate 10:1 ratio. In a typical scenario, a hold capacitor associated with an amplifier would be large enough to act as an ideal hold capacitor and the amplifier input would not have much if any effect on the hold voltage. However, in an embodiment such as shown in FIG. 1, that is not true since the variable coupling from the pixel amplifier 38 (as a function of previous pixel readouts and the floating, drifting, and/or bleed down of the nodes within pixel amplifier 38 when the amplifier 38 is totally off, if the data is not transferred to the pixel amplifier 38 when in standby) will add dark level variation and lag effects into the output level. Thus, the approximate 10:1 ratio of the hold capacitor 36 to the input capacitance of pixel amplifier 38 to some extent enables a practical, low-noise system.

Figure 3:
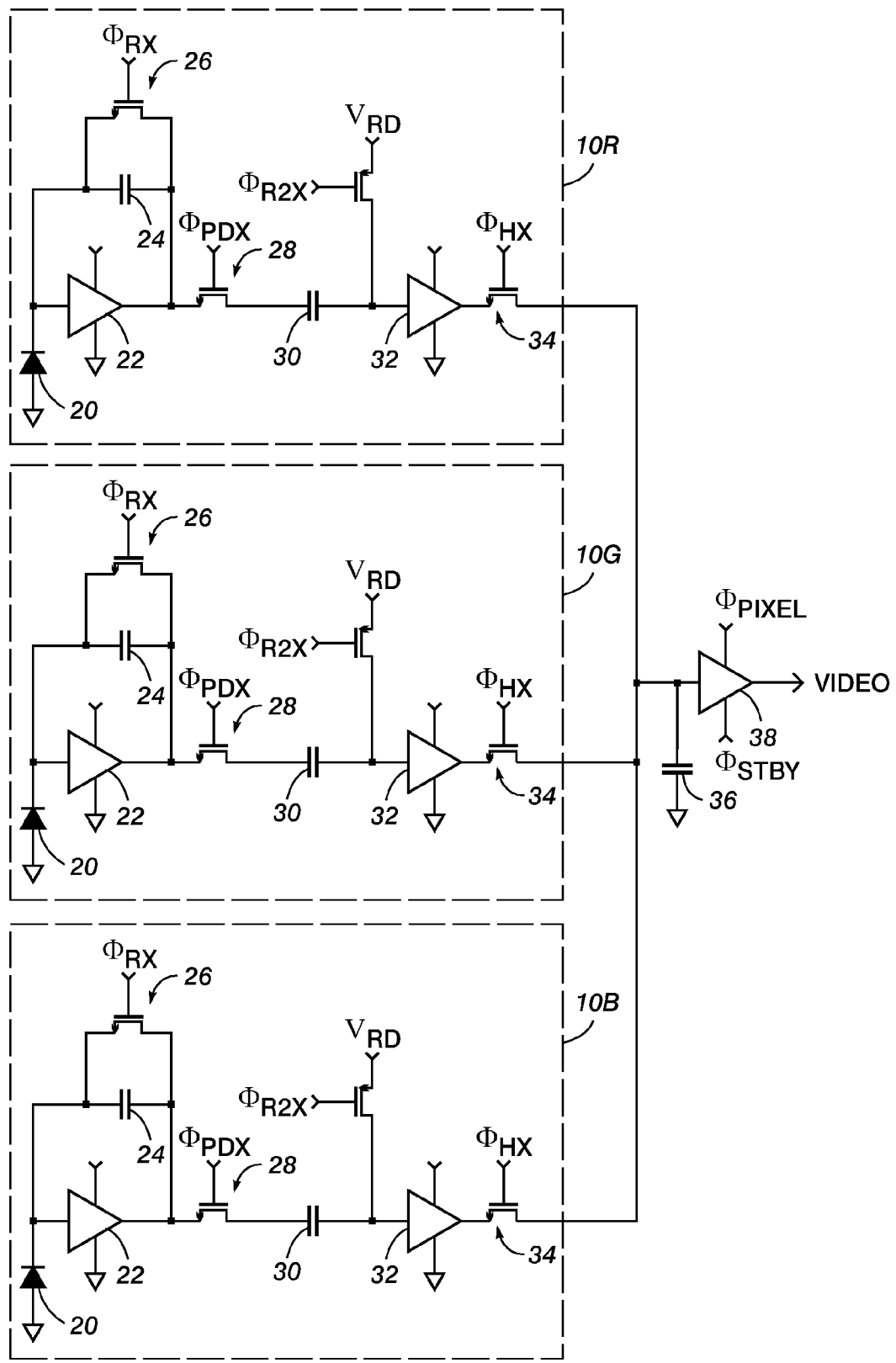
FIG. 3 is a schematic diagram of a plurality of photosites and associated readout circuitry.

FIG. 3 is a schematic diagram showing how a plurality of photosites can be associated with a single hold node 36 and pixel amplifier 38. In a practical implementation, each of three photosites 10 can be associated (such as with translucent filtering) with a different primary color to be scanned, such as red, green and blue, in the Figure labeled as 10R, 10G, and 10B respectively, in a manner largely analogous to that disclosed in U.S. Pat. No. 5,148,268.

In the FIG. 3 embodiment, the replication of all the circuitry shown in each photosite, along with the needed clocks, allows a single pixel amplifier to be used for high-speed readout of several different pixels or color rows. In addition, the replication of clocks among different photosites allows independent integration times for each set of primary-color photosites. If numerous photosites 10 are associated with a single hold node 36, the operation of the various photosites should be coordinated so that a single signal charge for one photosensor 20, is held at the hold node at a given time. However, the transfer of signals from each photosite 10R, 10G, and 10B respectively, each to be held at different time on the single hold node 36, will nonetheless facilitate a high latitude in independently selecting and controlling the integration time of the photosites 10R, 10G, and 10B, respectively.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:
1. An imaging apparatus, comprising:
a first photodiode;
a first integrating amplifier associated with the first photodiode;
a first reset capacitor, selectably associated with the first photodiode to flush charge on the first photodiode through the first integrating amplifier;
a first CDS capacitor downstream of the first integrating amplifier;
a hold capacitor forming a hold node downstream of the first CDS capacitor; and a pixel amplifier for reading out a signal from the hold node at a predetermined time, the pixel amplifier being selectably controllable between a standby mode and a power mode, wherein a relative current output of the pixel amplifier between the standby mode and the power mode being about 1:100.

2. The imaging apparatus of claim 1, a ratio of an input capacitance of the pixel amplifier to a capacitance of the hold capacitor being about 1:10.

3. The imaging apparatus of claim 1, further comprising a control system for isolating on the CDS capacitor a dark voltage plus a predetermined reference voltage.

4. The imaging apparatus of claim 3, the control system further causing a voltage to pass from the first integrating amplifier through the CDS capacitor, thereby effectively subtracting the dark voltage and reference voltage from the voltage, yielding a signal voltage.

5. The imaging apparatus of claim 3, the control system further causing the signal voltage to be held on the hold node.

6. The imaging apparatus of claim 1, further comprising a reference voltage source associated with the CDS capacitor.

7. The imaging apparatus of claim 1, further comprising a first hold switch disposed upstream of the hold node.

8. The imaging apparatus of claim 1, further comprising
a second photodiode;
a second reset capacitor, selectably associated with the second photodiode to flush charge on the second photodiode through the second integrating amplifier;
a second CDS capacitor downstream of the second reset capacitor;
the hold capacitor forming a hold node downstream of the second CDS capacitor.

9. The imaging apparatus of claim 8, the first photodiode being sensitive to a first color and the second photodiode being sensitive to a second color.

10. An imaging apparatus, comprising:
a first photodiode;
a first integrating amplifier associated with the first photodiode;
a first reset capacitor, selectably associated with the first photodiode to flush charge on the first photodiode through the first integrating amplifier;
a first CDS capacitor downstream of the first integrating amplifier;
a hold capacitor forming a hold node downstream of the first CDS capacitor; and
a pixel amplifier for reading out a signal from the hold node at a predetermined time, the pixel amplifier being selectably controllable between a standby mode and a power mode, wherein a ratio of an input capacitance of the pixel amplifier to a capacitance of the hold capacitor being about 1:10.

11. The imaging apparatus of claim 10, a relative current output of the pixel amplifier between the standby mode and the power mode being about 1:100.

12. The imaging apparatus of claim 10, further comprising a control system for isolating on the CDS capacitor a dark voltage plus a predetermined reference voltage.

13. The imaging apparatus of claim 12, the control system further causing a voltage to pass from the first integrating amplifier through the CDS capacitor, thereby effectively subtracting the dark voltage and reference voltage from the voltage, yielding a signal voltage.

14. The imaging apparatus of claim 12, the control system further causing the signal voltage to be held on the hold node.

15. The imaging apparatus of claim 10, further comprising a reference voltage source associated with the CDS capacitor.

16. The imaging apparatus of claim 10, further comprising a first hold switch disposed upstream of the hold node.

17. The imaging apparatus of claim 10, further comprising
a second photodiode;
a second reset capacitor, selectably associated with the second photodiode to flush charge on the second photodiode through the second integrating amplifier;
a second CDS capacitor downstream of the second reset capacitor;
the hold capacitor forming a hold node downstream of the second CDS capacitor.

18. The imaging apparatus of claim 17, the first photodiode being sensitive to a first color and the second photodiode being sensitive to a second color.

* * * * *